United States Patent [19]
Gaskin

[11] 4,096,956

[45] Jun. 27, 1978

[54] REFUSE VEHICLE

[76] Inventor: Raymond Lester Gaskin, 809 Valley Crest, La Canada, Calif. 91011

[21] Appl. No.: 762,401

[22] Filed: Jan. 26, 1977

Related U.S. Application Data

[63] Continuation of Ser. No. 592,349, Jul. 1, 1975, abandoned.

[51] Int. Cl.$^2$ .................. B60P 1/00; B65F 3/00

[52] U.S. Cl. .................. 214/82; 214/83.3; 214/518; 100/215

[58] Field of Search .................. 214/82, 83.3, 503, 518; 100/137, 215, 250

[56] References Cited

U.S. PATENT DOCUMENTS

| | | | |
|---|---|---|---|
| 3,211,309 | 10/1965 | Shubin | 214/83.3 |
| 3,366,255 | 1/1968 | Evans, Jr. | 214/82 X |
| 3,672,520 | 6/1972 | Linville | 214/82 |
| 3,799,376 | 3/1974 | Herpich et al. | 214/83.3 |
| 3,815,765 | 6/1974 | Moser et al. | 214/82 |

*Primary Examiner*—Albert J. Makay
*Attorney, Agent, or Firm*—James E. Brunton

[57] ABSTRACT

A refuse compaction apparatus adapted to be mounted upon a vehicle chassis. The apparatus is constructed as an integral unit and includes a refuse loading compartment and a refuse storage compartment. Movable longitudinally within the storage compartment is a large compaction blade adapted to move refuse rearwardly of the compartment and controllably compress it against the rear wall thereof. Located intermediate the loading and storage compartments is a unique transition mechanism adapted to cooperate with a pusher mechanism reciprocally movable within the loading compartment to cleanly transfer the refuse from the loading compartment into a position where it can be engaged by the compaction blade and moved rearwardly of the storage compartment for compaction. With this unique construction, fall-back of the refuse into the loading compartment is totally eliminated and highly efficient compaction and loading of the refuse within the storage compartment can be realized. Discharge of the refuse is conveniently accomplished by opening the end of the storage compartment and pushing the refuse therefrom, using the compaction blade.

4 Claims, 8 Drawing Figures

REFUSE VEHICLE

This is a continuation, of application Ser. No. 592,349, filed July 1, 1975, now abandoned.

BACKGROUND OF THE INVENTION

1. Field of the Invention

This invention relates generally to refuse collecting and disposal vehicles and more particularly to an apparatus adapted to be mounted upon a refuse vehicle chassis for loading, compacting and discharging the refuse.

2. Discussion of the Prior Art

Refuse collecting and disposal vehicles of various configuration and design have been constructed and used. In many of these vehicles the refuse is emptied from household refuse containers into a hopper or loading compartment located either at the forward or rearward end of a large closed refuse tank or container. The refuse is then deposited into the tank or container in a loose condition by either dumping or pushing the refuse from the loading compartment into the container. Because of the low specific gravity of typical household refuse, however, vehicles of this type require very large truck bodies and storage tanks, and the collection and transport of refuse in this manner is highly inefficient due to the high volume but low overall weight load carried by the truck. For these and other reasons, a few attempts have been made to develop apparatus to compact the refuse in the storage tank of the truck to enable greater amounts of refuse to be loaded and transported to the disposal area. Perhaps the most successful of these types of apparatus are described in U.S. Pat Nos. 2,750,055, issued to Huffines, and 2,961,105, issued to Shubin.

The Huffines patent describes a refuse compressor mechanism for vehicles which includes a closed body having side and end walls and a loading compartment disposed at the forward end of the body. A pusher means is reciprocally movable longitudinally of the loading compartment and is adapted to force refuse deposited in the loading compartment into the closed body through an opening formed in the forward bulkhead of the body. A principal drawback of the Huffines apparatus is that since the pusher blade is not reciprocally movable longitudinally of the closed body, refuse can be moved only a limited distance into the closed body. When the pusher blade is returned to the forward portion of the loading compartment, a portion of the refuse inevitably falls back into the loading compartment. This fall-back refuse limits the amount of material which can be deposited into the loading compartment and tends to interfere with the loading of additional refuse. Additionally, full and controlled compaction of the refuse cannot be accomplished with this system, and blockages tend to form in the forward portions of the storage tank.

The apparatus described in the Shubin patent is similar to that of Huffines and comprises a closed material tank having a substantially planar forward bulkhead provided with an inlet opening at its lower edge. The opening is of small area relative to the area of forward bulkhead. Disposed forwardly of the forward bulkhead is a loading bin into which the refuse is deposited. A pusher means in the form of a reciprocal piston is provided within the loading bin and functions to force the refuse deposited in the bin through the opening in the forward bulkhead into the closed storage tank. The announced theory of operation of the Shubin apparatus is that as the trash is forced through the opening in the forward bulkhead into the tank, the compressing action of the trash being admitted to the tank causes "a boiling circulatory moving of the trash within the tank and a compressing action upon the trash." Allegedly, this compressing action causes the trash to move into and circulate throughout the tank, much in the manner of fluid flow, with the trash moving to the roof of the tank and filling all corners due to its flow to points of least resistance within the tank. However, as was the case with the Huffines apparatus, a drawback of the Shubin apparatus is that since the pusher member is not reciprocally movable within the storage tank, when the member is returned to its forward position, refuse located at the forward end of the tank tends to fall back into the loading bin thereby interfering with the loading of additional refuse and limiting the amount of refuse which can be deposited in the loading bin prior to reactivation of the pushing member.

An additonal drawback of both the Huffines and Shubin vehicles is that the refuse is discharged from the vehicle by raising the storage tank so as to cause the refuse to be discharged from the tank through a rear opening due to the force of gravity. This method of dumping has presented problems in actual practice. Because of the great weight of the truck and its inherent instability when the storage container is in its upraised or dump position, unevenness of the ground supporting the rear wheels of the truck can cause the truck to tip over onto its side, resulting in significant damage to the apparatus. Similarly, the sinking of one set of rear wheels of the truck into soft or uncompacted ground often found in disposal areas can cause the truck to tip over.

The apparatus of the present invention overcomes the drawbacks of the prior art devices by providing a unique mechanism wherein the trash deposited in the loading compartment is first moved by means of a curved pusher blade onto a planar transition member disposed intermediate the loading and storage compartments of the apparatus. This planar member is pivotally movable from a first inclined refuse loading position into a second position wherein the member is in a coplanar relationship with the floor of the storage compartment or storage tank of the vehicle. After the transition member has been loaded and moved into the second position, a compaction blade adapted to move longitudinally throughout the entire length of the storage compartment, is activated to remove the trash from the transition member and carry it rearwardly of the vehicle where it is compacted against the end wall of the storage compartment. The unique design of the transition member is such that it cooperates with the curved blade of the pusher blade to prevent any refuse from falling back into the loading bin during movement of the transition member into its second position. The transition member and the pusher blade then cooperate to ensure that all of the refuse which has been deposited onto the transition mechanism is cleanly moved rearwardly of the storage compartment by the compaction blade for controlled compaction against the end wall of the storage compartment. With this arrangement, refuse is prevented from falling back into the loading bin thereby ensuring that the full capacity of the loading bin is available for the succeeding loading operation.

When it is desired to discharge the refuse from the vehicle, the end wall of the storage compartment may be opened and the compaction blade moved rearwardly along the entire length of the storage compartment to cleanly push all of the refuse from the storage compartment into the dumping area. This construction eliminates the need to lift the storage compartment into an unstable elevated or dumping position.

Another advantage of the present system is that the entire apparatus, including the storage compartment, the loading bin, and the transition mechanism, can be made as an integral unit which can be mounted directly onto the chassis of a truck of standard commercial design. Provision of costly lifting systems for lifting the storage tank of the vehicle is avoided and the significant danger of overturning the truck during the dumping operation is totally eliminated.

Additional prior art structures known to the applicant are the structures described in the U.S. Pat. Nos. to Shubin, 3,211,309, and to Luzzatto, 649,413. These patents, along with the Shubin U.S. Pat. No. 2,961,105 and Huffines patents previously identified, represent the most pertinent art known to applicant.

SUMMARY OF THE INVENTION

It is an object of the present invention to provide an integral apparatus which can readily be mounted upon a vehicle chassis of a conventional type for efficiently loading and compacting compressible material such as refuse.

It is another object of the invention to provide an apparatus of the aforementioned character wherein the refuse can be controllably compacted so as to fully utilize the volume of the refuse storage compartment of the apparatus and the weight-carrying capacity of the vehicle. In this regard, it is an object of the invention to provide a unique compaction mechanism which prevents build-up of refuse near the forward portion of the storage compartment and functions to continually move the refuse rearwardly of the compartment for compression against the end wall thereof.

It is another object of the present invention to provide an improved method for unloading the storage compartment of the apparatus which eliminates the necessity of elevating it relative to the truck chassis into a highly unstable dumping position.

It is another object of the present invention to provide a unique refuse transfer mechanism disposed intermediate the loading and storage compartments of the apparatus, which mechanism is adapted to cooperate with the other operating subassemblies of the apparatus to eliminate refuse fall-back into the loading compartment during the compaction cycle.

It is a further object of the invention to provide a mechanism for moving refuse deposited into the loading compartment directly onto the transfer mechanism and to cooperate therewith during the refuse compaction cycle to ensure complete compaction of all the refuse which has been loaded into the loading compartment.

It is still another object of the invention to provide side loading access to the apparatus to permit large objects to be deposited directly onto the transfer mechanism.

It is another object of the invention to provide an apparatus of the character described which is simple in construction, efficient in operation, is relatively lightweight to enable carrying the maximum payload, and is relatively inexpensive to manufacture.

These and other objects of the invention are realized by providing a refuse compaction apparatus having a refuse loading compartment; a storage compartment disposed proximate the loading compartment and in operable communication therewith, the storage compartment having a floor and an end wall with the floor being elevated with respect to the floor of the loading compartment; a transfer mechanism disposed intermediate the loading compartment and the storage compartment and operably interconnecting the two compartments; a refuse pushing mechanism reciprocally movable longitudinally of the loading compartment for pushing the refuse out of the loading compartment onto the transfer mechanism; a mechanism for elevating the transfer mechanism into a substantially coplanar relationship with the floor of the storage compartment; and a compaction blade movable longitudinally of the loading compartment for removing the refuse from the transfer mechanism and moving it rearwardly of the storage compartment to compact it against the end wall thereof.

BRIEF DESCRIPTION OF THE DRAWINGS

In FIG. 2, the various elements of the apparatus are shown in their initial or starting position with refuse having been loaded into the loading compartment.

DESCRIPTION OF ONE EMBODIMENT OF THE INVENTION

Figure 1:
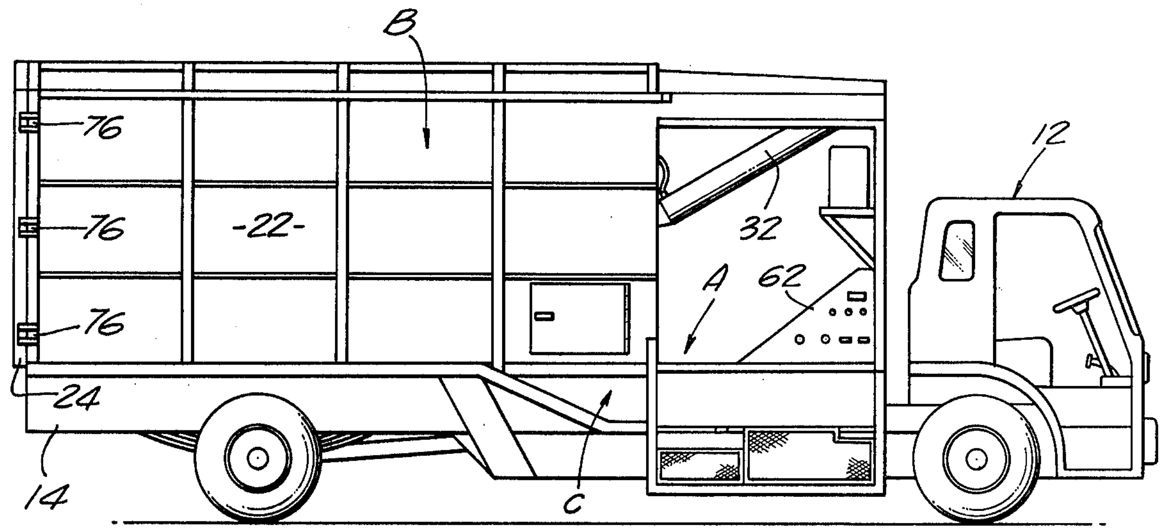
FIG. 1 is a side elevational view of the apparatus of the invention shown mounted upon the chassis of a vehicle of conventional design.
Figure 3:
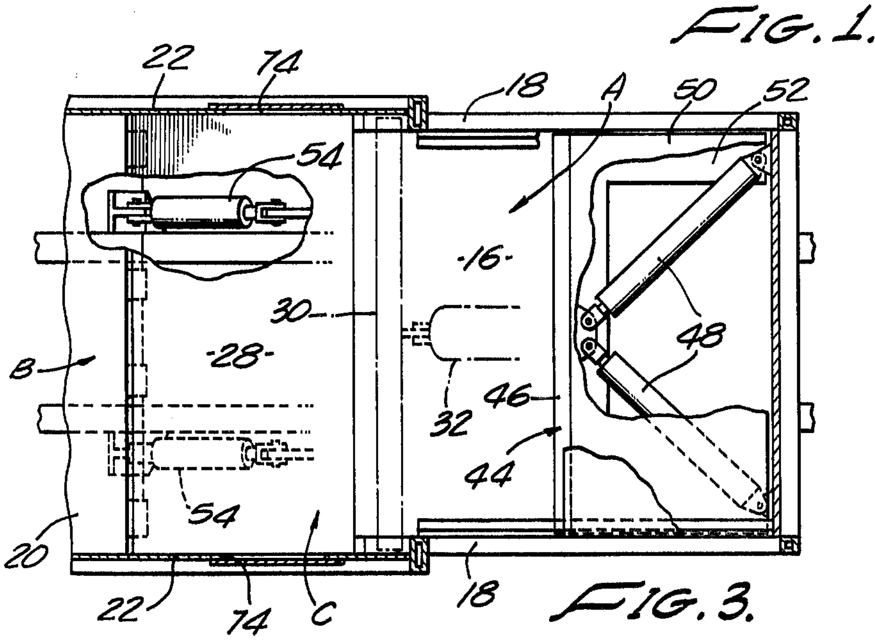
FIG. 3 is a view taken along lines 3—3 of FIG. 2 and is enlarged and partly broken away to illustrate the construction of the refuse pusher means, the refuse transfer means, and refuse compaction means of the apparatus.

Referring now to the drawings and particularly to FIG. 1, one embodiment of the apparatus of the invention is shown mounted upon a truck of the conventional type having a cab section 12 and an elongated chassis 14. In general, the apparatus of the invention comprises a refuse loading zone or compartment A, a forwardly open refuse storage zone or compartment B disposed rearwardly of the loading compartment, and a refuse transition or transfer zone C disposed intermediate the loading compartment and the storage compartment. The refuse loading compartment A has a generally horizontally extending floor 16 and spaced apart generally parallel side walls 18 (FIG. 3). Floor 16 of loading compartment A spans the chassis of the truck and is supported thereby. Refuse storage compartment B is disposed rearwardly of the loading compartment A and is in open communication therewith.

Figure 2:
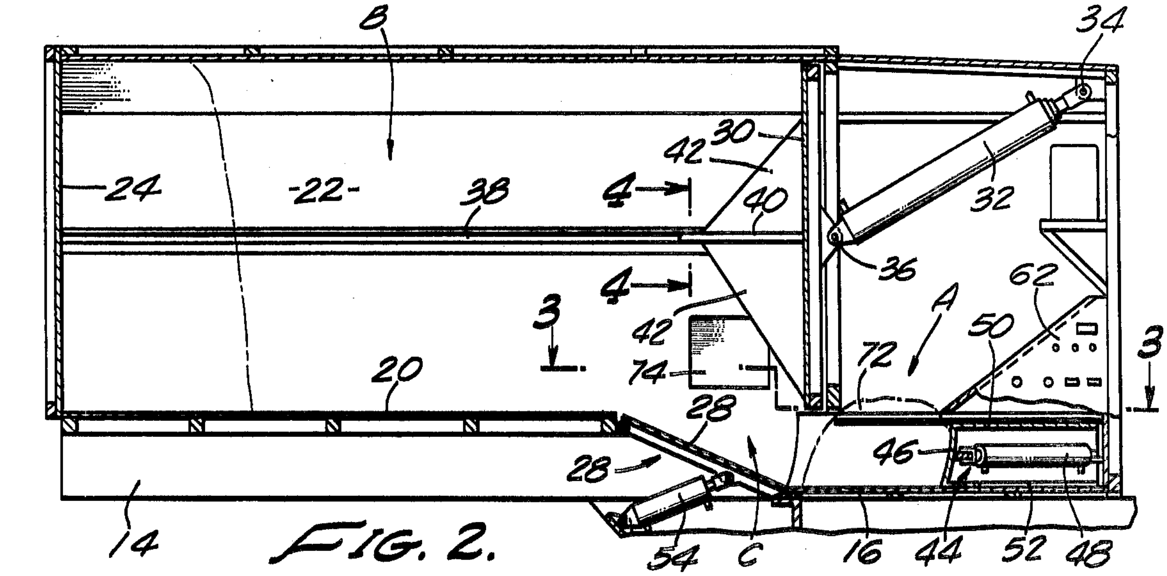
FIG. 2 is a slightly enlarged view of the apparatus of the invention drawn partly in cross-section to illustrate internal construction.
Figure 5:
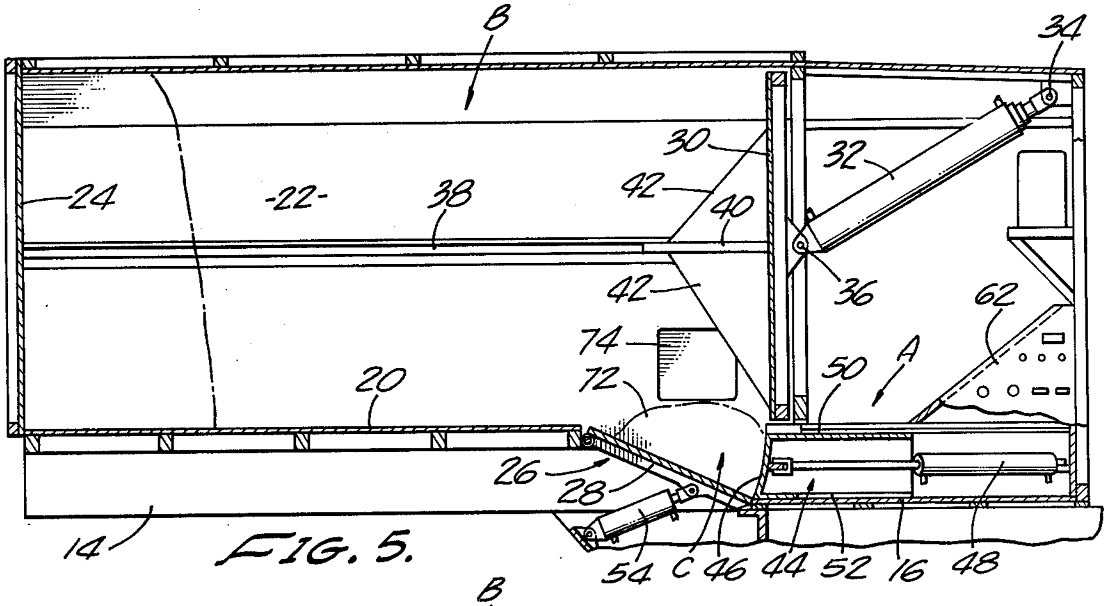
FIG. 5 is a side elevational view similar to FIG. 2 but showing the position of the various parts of the apparatus after the refuse has been moved from the loading zone or compartment onto the transfer mechanism of the invention.

As best seen in FIGS. 2 and 3, storage compartment B has a floor 20, spaced apart generally vertically extending side walls 22, and an end wall 24. End wall 24 is formed in two sections or doors, each of which is pivotally mounted on side walls 22 so that they may be swung open to permit discharge of the refuse contained within the storage compartment in a manner presently to be discussed. Floor 20 of storage compartment B, which is elevated with respect to floor 16 of loading compartment A, spans the chassis 14 of the truck and is supported thereby.

Figure 6:
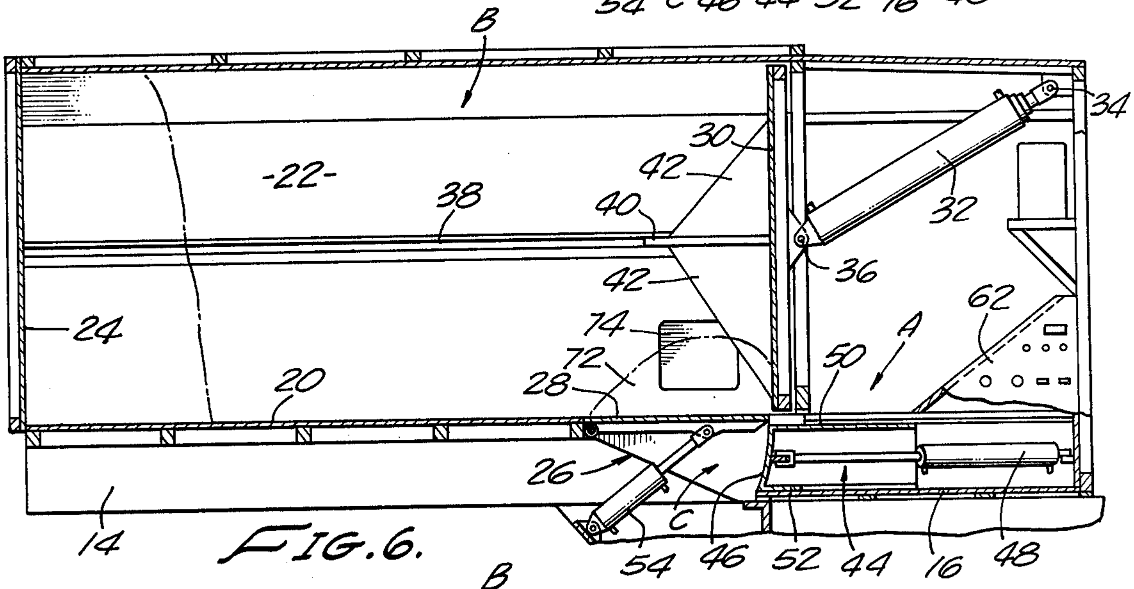
FIG. 6 is a cross-sectional view similar to FIG. 5 but showing the position of the parts of the apparatus after the transfer mechanism has been lifted into a substantially coplanar relationship with the floor of the storage compartment of the apparatus.

Disposed intermediate the loading compartment A and storage compartment B, and forming a part of the transition or transfer zone C, is a refuse transfer means generally designated in FIG. 2 by the numeral 26. Transfer means 26, in the form of the invention shown in the drawings, is movable from a first position to a second position and comprises a generally planar member 28. As illustrated in FIGS. 2 and 6, member 28 is pivotally movable from a first position defining an inclined plane interconnecting the floors 16 and 20 of the loading and storage compartments respectively (FIG. 2) to a second position wherein member 28 is substantially coplanar with floor 20 of the storage compartment (FIG. 6). The function and purpose of the transfer means will be described in detail in the section which follows entitled "Operation."

Referring particularly to FIG. 2, the apparatus of this form of the invention includes compaction means in the form of a compaction blade 30 movable longitudinally throughout the entire length of storage compartment B. As best seen in FIG. 3, compaction blade 30 extends transversely of storage compartment B and is of a width substantially coextensive with the width of the storage compartment. Also forming a part of the compaction means of the invention is a fluid actuated means, shown here in the form of a hydraulic cylinder assembly 32 (FIG. 2). Assembly 32 is of a type well known in the art comprising a plurality of telescopically interconnected members housing a fluid actuated piston. The piston is caused to travel in the desired direction by appropriate valving which admits fluid under pressure to the side of the piston opposite the direction in which the piston is to be moved. One end of assembly 32 is pivotally connected at 34 near the forward end of the apparatus proximate the top thereof. The other end of the assembly is pivotally connected at 36 to compaction blade 30 proximate the center thereof. Fluid actuation of hydraulic cylinder 32 will result in the telescopic extension of the cylinder in the manner illustrated in FIG. 7, causing the compaction blade to move rearwardly within storage compartment B to a position proximate end wall 24 thereof.

Figure 4:
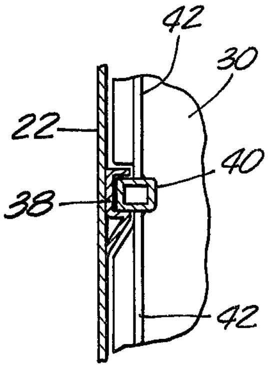
FIG. 4 is an enlarged fragmentary cross-sectional view taken along lines 4—4 of FIG. 2 showing the construction of the guide means of the apparatus for guiding movement of the compaction blade within the storage compartment of the apparatus.

Referring now to FIGS. 3 and 4, it can be seen that side walls 22 of storage compartment B are provided with guide means in the form of generally U-shaped channels 38 extending longitudinally along the entire length of the side walls. Channels 38 are adapted to guidably receive transversely protruding elements 40 provided in each side of compaction blade 30. In the embodiment of the invention shown in the drawings, side elements 40 are shown in the form of longitudinally extending channel members generally rectangular in cross-section. Members 40 are affixed to wing-like structural support members 42 (FIG. 2) which are connected to compaction blade 30 and serve to rigidize the structure and enable smooth reciprocal movement of blade 30 within storage compartment B.

Provided within loading compartment A are pusher means reciprocally movable longitudinally of the loading compartment for pushing refuse out of the compartment onto transfer member 28 when the latter member is in its first or lowered position. In the form of the invention shown in the drawings, the pusher means comprises a pusher assembly 44 (FIG. 2) having a curved refuse engaging blade 46 extending transversely substantially the entire width of the loading compartment and movable by a fluid actuated means from a first forward position to a second rearward position adjacent planar member 28. The fluid actuated means comprises two identical hydraulic cylinder assemblies 48 of a type well known in the art which are adapted to cooperate to move blade 46 forwardly of loading compartment A. As best seen in FIG. 3, assemblies 48 are arranged in a substantially horizontal plane with their axes lying at an angle to one another and operate in parallel to reciprocate blade 46. The rearward ends of assemblies 48 are pivotally connected to the central portion of blade 46 and the forward ends of the cylinders are connected to the opposite lateral sides of the loading compartment A. It has been found desirable to connect assemblies 48 to blade 46 slightly above its vertical center line so as to cause a slight downward force to be exerted on blade 46 as it moves rearwardly of the loading bin or compartment. The pusher means also comprise a planar top member 50 and a spaced apart generally parallel planar bottom member 52. Bottom member 52 is adapted to slidably move along floor 16 of loading compartment A as blade 46 is moved reciprocally within the loading compartment.

Forming a part of refuse transfer means 26 are a pair of identical transversely spaced apart hydraulic cylinder assemblies 54 which are operatively interconnected with transfer member 28 to move member 28 from its first or lowered position shown in FIG. 2 to its elevated or raised position shown in FIG. 6. Assemblies 54 are also of a conventional type well known in the art and cause travel in the desired direction by appropriate valving which admits fluid under pressure to pistons reciprocally carried within piston cylinders or housings.

Figure 8:
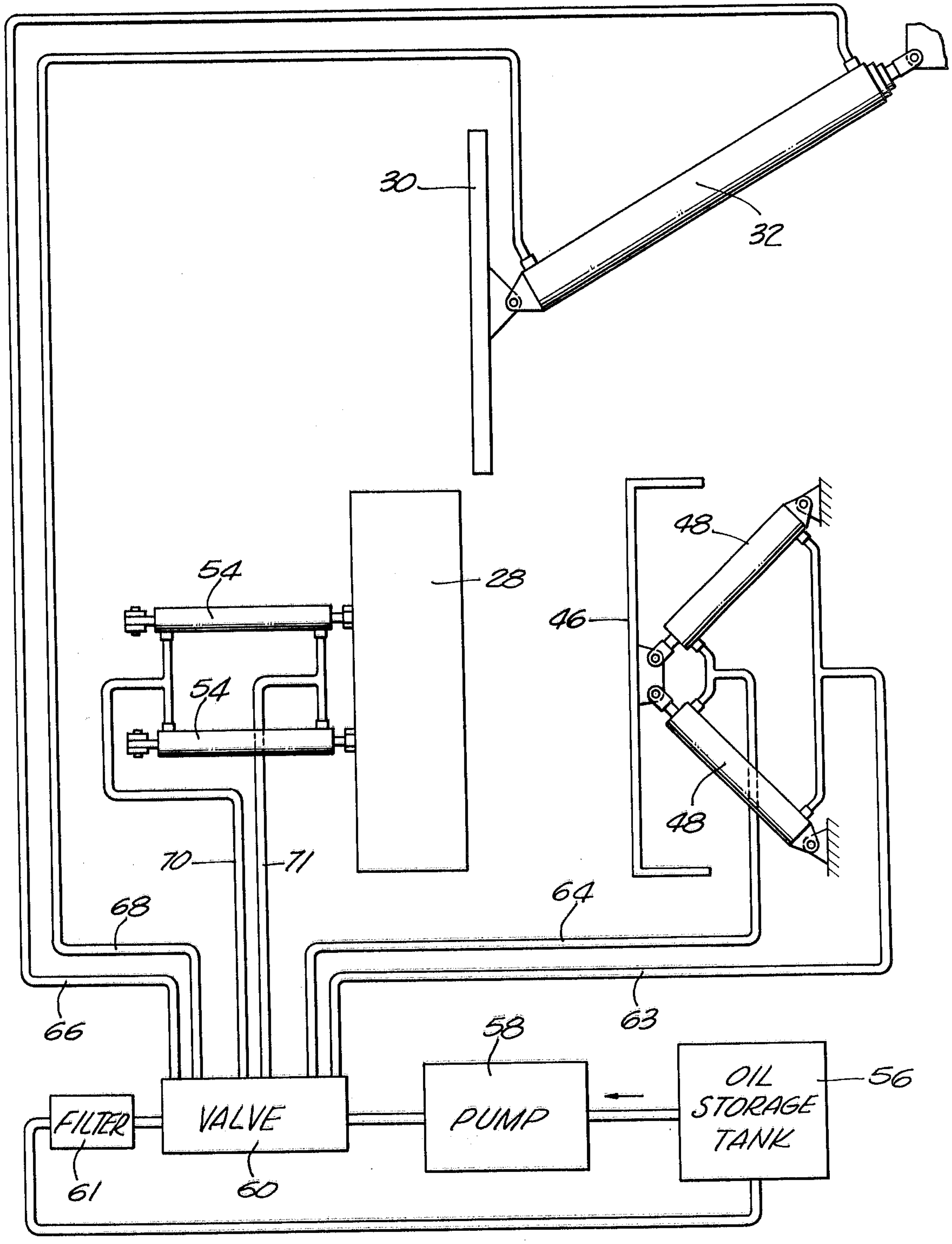
FIG. 8 is a schematic representation of the hydraulic system of the apparatus for actuating the moving elements of the embodiment of the invention illustrated in FIGS. 1-7.

The general arrangement of the hydraulic system of the embodiment of the invention shown in the drawings is illustrated in FIG. 8. This system comprises a fluid storage tank 56 adapted to store a suitable hydraulic fluid such as oil. A pump 58 is operably connected to storage tank 56 and, when activated, causes fluid flow in the direction indicated by the arrow toward a valve arrangement 60, through the various operating assemblies of the system, and back through a suitable filter 61 to storage tank 56. Valving arrangement 60 is of a type readily understood by one skilled in the art and may be mounted at any convenient location such as on a control panel generally designated by the numeral 62 in FIG. 1. Valve 60 controls fluid flow from pump 58 through suitable fluid lines to the various fluid means of the invention previously identified. More specificaly, as schematically illustrated in FIG. 8, fluid flow lines 63 and 64 are provided to carry fluid to and from hydraulic cylinders 48 which form a part of the means for urging reciprocal movement of blade 46 within loading compartment A. Similarly, lines 66 and 68 carry fluid to and from hydraulic cylinder 32 of the fluid actuated means for moving compaction blade 30 reciprocally within storage compartment B. Lines 70 and 71 are provided to carry fluid from valve 60 to hydraulic cylinders 54 which form a part of the fluid actuated means for moving transition member 28 from its first or lowered position to its second or elevated position. It is to be appreciated that various types of fluid systems, including compressed gas systems, may be used to activate the various fluid actuated means of the invention. Similarly, various types of pumps and valving arrangements may readily be designed by those skilled in the art without departing from the scope of the invention to accomplish the desired movement of the various movable elements described herein.

OPERATION

The operation of the apparatus of the invention can best be understood by referring to FIGS. 2–7. With the various subassemblies in the position illustrated in FIG. 2, refuse, such as household waste and the like, generally designated by the numeral 72, is deposited from the home owners' refuse containers into loading bin or compartment A. Since loading compartment A is in open communication with and extends partially into transition zone C, refuse may be thrown rearwardly into zone A toward transfer member 28. If desirable, larger pieces of waste or boxes and the like may be introduced directly into transfer zone C through an opening 74 provided in side wall 22 of storage compartment B. In this way, the area designated herein as the transfer zone can in fact be used for loading and becomes a part of the loading compartment or zone. After loading compartment A is filled, valve 60 (FIG. 8) is activated to permit fluid flow to hydraulic cylinder assemblies 48 in a manner to cause pusher blade 46 to move rearwardly of the loading compartment A into the position shown in FIG. 5. With transfer member 28 in its first or lowered position, this rearward movement of blade 46 will cause the refuse 72 to be pushed onto transfer member 28. Next, with blade 28 in its full rearward position, valve 60 is activated to permit fluid flow through line 70 to hydraulic cylinders 54 in a manner to cause member 28 to move from the position shown in FIG. 5 to its elevated position shown in FIG. 6 wherein it is substantially coplanar with floor 20 of storage compartment B. It is to be noted that the curvature of blade 46 closely corresponds with the arc generated by the movement of the forward or leading edge of transfer member 28 as the member moves from its first to its second position. As member 28 is elevated, therefore, its leading edge remains at all times in close proximity with blade 46 thereby preventing refuse from falling between blade 46 and planar member 28 or from falling back into loading compartment A.

Figure 7:
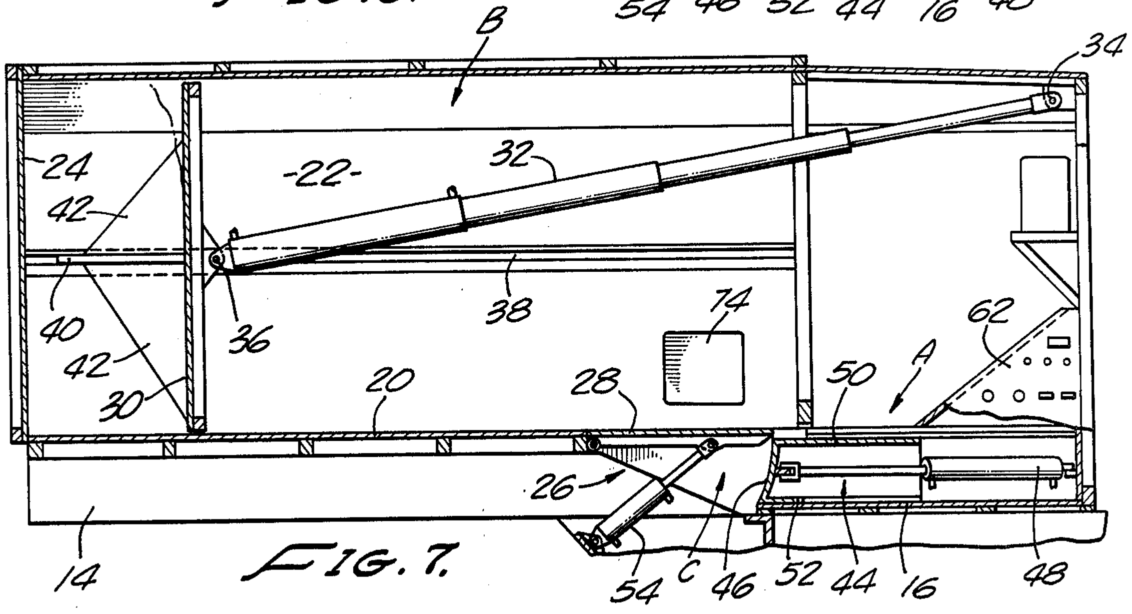
FIG. 7 is a side elevational view similar to FIG. 6 but showing the position of the parts of the apparatus after the compaction blade has removed the refuse from the transfer mechanism, moved it rearwardly of the storage compartment, and compacted it against the end wall of the storage compartment.

After the assemblies have been moved into the positions illustrated in FIG. 6, valve 60 is activated to permit fluid flow through line 66 to hydraulic cyclinder 32 in a manner to cause compaction blade 30 to move rearwardly within storage compartment B to a position proximate end wall 24 as illustrated in FIG. 7. This movement of blade 30 causes the refuse 72 to be cleanly wiped from transfer member 28 and moved rearwardly of storage compartment B for efficient, controlled compression thereof against end wall 24. After the refuse is thus compacted, valve 60 is manipulated in a manner to cause blade 30 to be moved forwardly of the apparatus by hydraulic cylinder assembly 32 to its starting position. Valve 60 is then manipulated appropriately to cause activation of hydraulic cylinder assemblies 48 and 54 in a manner to move blade 46 and member 28 respectively into their starting positions shown in FIG. 2. With the components in this position, additional refuse can be deposited in loading compartment A and the cycle repeated until storage compartment B is fully and compactly loaded.

Because of the unique cooperative interaction of the various operating assemblies of the apparatus, fall-back of refuse into the loading compartment is totally prevented, making the full capacity of the loading compartment available for each successive loading operation. This fact, coupled with the unique method of loading and compacting the refuse within the storage compartment B, results in highly efficient packing of the apparatus and permits maximum possible use of the loading capacity of the vehicle.

After the apparatus has been fully loaded and transported to the disposal area, the door sections of end wall 24 are swung into an open position about hinges 76 (FIG. 1). Valve 60 is then activated to permit fluid flow through line 66 to hydraulic cylinder 32 so as to once more cause compaction blade 30 to move rearwardly of storage compartment B. This rearward movement of compaction blade 30 results in the complete and efficient discharge of the refuse from the storage compartment through the rear thereof. With this construction, it is not necessary to raise the storage compartment into an elevated dumping position. Rather, the storage compartment is maintained in a stable horizontal position at all times thereby significantly enhancing the safety of the refuse discharging operation.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus adapted to be mounted upon a vehicle chassis rearwardly of the cab thereof for loading and compacting compressible material comprising:

(a) a refuse loading compartment disposed rearwardly of the cab having a floor and side walls;

(b) a forwardly open storage compartment disposed rearwardly of said loading compartment and in open communication therewith having side walls, a substantially vertically disposed end wall and a floor elevated with respect to the floor of said loading compartment;

(c) a generally planar member disposed intermediate said loading and storage compartments said member being pivotally connected to said storage compartment proximate the forward edge of said floor thereof and being pivotally movable from a first position defining an inclined plane interconnecting said floors of said storage and loading compartments to a second generally horizontal position substantially coplanar with said floor of said storage compartment;

(d) a longitudinally movable, generally vertically disposed, substantially planar compaction blade including means for moving said blade comprising a fluid actuated assembly consisting of a plurality of telescopically interconnected members housing a fluid actuated piston, one end of said assembly being connected to said compaction blade for uniform movement of said blade, the other end of said assembly being connected to the forward end of the loading compartment, said compaction blade being movable relative to said planar member from a first position forward of the forward edge of said planar member wherein said blade closes the forward opening in said storage compartment, to a second position proximate said rearward end wall of said storage compartment said blade being constructed and arranged to cooperatively interact with said planar member for removing refuse from said planar member when the latter is in a second position and carrying the refuse rearwardly of said planar member and storage compartment toward the end wall thereof for compaction of the trash between said compaction blade and said end wall;

(e) a pusher assembly carried within said loading compartment and reciprocally movable rearwardly beneath said compaction blade to a position proximate said planar member for moving refuse deposited into said loading compartment onto said planar member when said latter member is in a first position, said pusher assembly being provided with a curved refuse engaging blade adapted to cooperate with said planar member to lift the trash deposited thereon as said member is raised to said second position, the curvature of said blade closely corresponding to the arc generated by the movement of the forward edge of said planar member as said member moves from said first to said second position, whereby as said member is moved to said second position said blade and said planar member cooperatively interact so that as the trash is lifted it will not fall between said blade and said planar member; and (f) means for moving said planar member from the first to second postion.

2. The apparatus as defined in claim 1 in which said end wall of said storage compartment is pivotally movable from a position closing the rear of said compartment to a position wherein the rear of said compartment is open and in which said generally vertically disposed compaction blade is movable longitudinally of said storage compartment to a position proximate said end wall and substantially parallel thereto whereby refuse within said storage compartment can be compacted against said end wall when the latter is in a closed position and discharged from said compartment when said end wall is in an open position.

3. The apparatus as defined in claim 1 in which the width of said compaction blade substantially corresponds to the width of said storage compartment.

4. A refuse compaction apparatus comprising:

(a) a refuse loading compartment having a floor and side walls;

(b) a storage compartment located rearwardly of said loading compartment having a floor and interconnected top and side walls, said storage compartment being open at its forward end and closed at its rearward end by an end wall adapted to be pivotally movable from a position closing the rear of said compartment to a position wherein the rear of said compartment is open;

(c) a planar member pivotally mounted on said storage compartment for pivotal movement between a first position defining an inclined plane interconnecting said floors of said loading and storage compartments to a second generally horizontal position substantially coplanar with the floor of said storage compartment and defining a forward extension thereof;

(d) a longitudinally movable, generally vertically disposed planar compaction blade movable longitudinally within said storage compartment from a first position wherein said blade closes the forward open end of said storage compartment to a second position proximate and substantially parallel to said end wall, said blade being adapted to cooperate with said planar member when said member is in its second position to clearly remove trash therefrom and then to carry the trash rearwardly of the storage compartment for compaction between said blade and said end wall thereof;

(e) means for moving said compaction blade rearwardly of said storage compartment said means comprising a fluid actuated assembly consisting of a plurality of telescopically interconnected members housing a fluid actuated piston, one end of said assembly being connected proximate the center point of said compaction blade;

(f) a refuse engaging blade extending transversely of said loading compartment for moving refuse rearwardly into said storage compartment, said refuse engaging blade having a curved face, the curvature of which closely corresponds to the arc generated by the movement of the forward edge of said planar member as said member moves from said first to said second position, said refuse engaging blade being movable beneath said compaction blade into cooperative juxtaposition with the forward edge of said planar member, whereby as said member is moved to its second position said blade and said planar member cooperate to lift trash deposited thereon into the plane of the floor of said storage compartment; and (g) means for moving said refuse engaging blade rearwardly of said loading compartment to said second position said means comprising two hydraulic cylinder assemblies, the rearward ends of which are connected to said sides of said loading compartment and the forward ends of which are connected to the central portion of said blade slightly above the vertical centerline thereof to cause a downward force to be exerted on said blade as said blade is moved rearwardly.

* * * * *